United States Patent [19]
Parmentier et al.

[11] 3,717,773
[45] Feb. 20, 1973

[54] NEURISTOR TRANSMISSION LINE FOR ACTIVELY PROPAGATING PULSES

[75] Inventors: Robert D. Parmentier, Brooklyn; Alwyn C. Scott, Madison, both of Wis.

[73] Assignee: Wisconsin Alumni Research Foundation, Madison, Wis.

[22] Filed: May 10, 1971

[21] Appl. No.: 141,773

Related U.S. Application Data

[62] Division of Ser. No. 746,087, July 19, 1968, Pat. No. 3,599,009.

[52] U.S. Cl. ............... 307/201, 307/298, 307/306, 317/234 C, 317/234 T, 333/99 S
[51] Int. Cl. ............................................. H03k 3/26
[58] Field of Search ..... 307/201, 298, 306; 333/99 S; 317/234 T, 234 C

[56] References Cited

UNITED STATES PATENTS

| | | | |
|---|---|---|---|
| 3,178,594 | 4/1965 | Pollack | 307/298 X |
| 3,522,492 | 8/1970 | Pierce | 307/298 X |
| 3,218,482 | 11/1965 | Green | 307/201 |
| 3,281,609 | 10/1966 | Rowell | 317/234 T |
| 3,356,864 | 12/1967 | Giaever | 307/306 X |
| 3,370,210 | 2/1968 | Fiske | 317/234 T |

*Primary Examiner*—Stanley D. Miller, Jr.
*Attorney*—Burmeister, Palmatier & Hamby

[57] ABSTRACT

A neuristor transmission line is disclosed, capable of propagating a pulse without substantial attenuation, and comprising a pair of elongated closely spaced line conductors made of superconductive materials, and a thin barrier layer of non-superconductive material disposed between said line conductors, said layer being sufficiently thin to be readily penetrable by tunneling electrons. A learning junction is also disclosed, adapted to be connected between neuristor transmission lines, and comprising a pair of superconductive elements, and an intermediate element of saturable ferromagnetic material disposed between said superconductive elements. Also disclosed is an array of artificial neurons, comprising a plurality of neuristor transmission lines as described above, and a plurality of learning junctions connected between at least some of said neuristor transmission lines.

24 Claims, 20 Drawing Figures

NEURISTOR TRANSMISSION LINE FOR ACTIVELY PROPAGATING PULSES

This application is a division of our copending application Ser. No. 746,087, filed July 19, 1968, now U.S. Pat. No. 3,599,009, issued Aug. 10, 1971.

The invention described herein was made in the course of or under a grant from the National Science Foundation, an agency of the United States Government.

One of the most significant goals of electrical technology is to construct an electronic machine with functional abilities similar to those of the human brain. However, great difficulties are involved. The brain comprises a thick covering or cortex of gray matter comprising approximately $10^{10}$ neurons or active elements. In addition, the brain contains complex regulating circuitry in the cerebellum.

Neurons have the ability to propagate nerve impulses without substantial attenuation. In addition, each neuron has a learning ability.

Anyone who would build an electronic brain has at least three major problems: cost, power dissipation and design complexity. The cost of $10^{10}$ active elements, wired in place in the electronic machine, can be fantastic. Thus, for example, even if the wired-in cost of each active element is only one cent, the total cost would be one hundred million dollars.

The power dissipation tends to be so high as to be totally destructive, due to the excessive generation of heat. Thus, for example, even if the power dissipation of each active element is only one microwatt, the total power dissipation of $10^{10}$ active elements would be ten kilowatts.

It is virtually impossible to assemble $10^{10}$ active elements without introducing some errors or defects in the connections between the elements. Thus, if the design of the electronic brain is so complex as to require every interconnection to be correctly made, the completion of the electronic brain as an operative machine will be virtually impossible.

Considerable attention has been given to the development of electronic components and systems suitable for use in electronic brains. In this connection, the term neuristor was introduced by H. D. Crane to refer to a class of distributed electronic devices which can support the propagation of electrical pulses in somewhat the same fashion as does a nerve axon. This term was introduced by Crane in his paper entitled "Neuristor - a novel device and system concept," published in the Proceedings of the IRE, vol. 50, pp. 2048–2060, for October of 1962.

The present invention provides a neuristor transmission line capable of propagating a pulse without substantial attenuation. The neuristor transmission line is not merely a passive device, but is capable of propagating the pulse in an active manner, whereby the pulse is continuously regenerated or amplified as it is propagated, so that the propagation can continue an indefinite distance without substantial attenuation.

Generally, the neuristor transmission line of the present invention comprises a pair of elongated, closely spaced, superconductive line conductors, with an extremely thin barrier layer of a non-superconductive material disposed therebetween. The layer is sufficiently thin to be readily penetrable by tunneling electrons. The tunneling electrons may be either so-called normal electrons or superconducting electrons. To provide for superconducting electron tunneling, the barrier layer must be thinner than in the case of tunneling by normal electrons. Thus, for example, normal electron tunneling through the barrier layer will occur at a layer thickness of approximately 40 angstroms, but to produce tunneling by superconducting electrons the layer thickness must be reduced to approximately 20 angstroms or less. These figures are cited only by way of example and are subject to variation in accordance with the materials employed. To achieve these superconductive effects, the neuristor transmission line must be maintained at an extremely low temperature near absolute zero. The line conductors are preferably made of two different superconductive materials for normal electron tunneling but may be of the same or different materials for superconducting electron tunneling. Various materials may be employed. For example, one line conductor may be made of tin, and the other of lead. By way of further example, one line conductor may be made of a tin-aluminum alloy, while the other conductor is made of lead.

The barrier layer may be made of any suitable material which is not superconductive, but through which electron tunneling can occur. Various insulating materials may be employed, as well as various materials which exhibit normal conductivity but not superconductivity. Such conductive materials function as insulators between superconductive members, because the superconductive members exhibit zero resistance, while the non-superconductive materials exhibit appreciable resistance which is disproportionate by comparison. Thus, the barrier layer may be made of various metals, such as copper, silver, gold or nickel, for example, which are conductors but non-superconductors. Copper is particularly advantageous. Semiconductors may also be employed. The barrier layer must be thin enough to permit electron tunneling through the layer.

The barrier layer may advantageously comprise an insulating material in the form of a thin layer of oxide on one of the superconductive line conductors. Thus, the insulating material may comprise a thin layer of tin oxide, or an oxide coating formed on the tin-aluminum alloy.

A biasing current is provided between the line conductors of the neuristor transmission line. The biasing current produces electron tunneling through the barrier layer of non-superconductive or insulating material. Depending upon the thickness of the layer, the tunneling may be produced by either normal electrons or superconducting electrons. It has been found that there is a range of the biasing current for which the neuristor transmission line is capable of propagating a pulse in an active manner, without substantial attenuation. Within this range, the neuristor transmission line exhibits a negative resistance characteristic which produces sustained propagation of the pulse.

The present invention also provides a learning junction, adapted to be connected between neuristor transmission lines. Generally, the learning junction comprises a pair of superconductive elements or segments, together with an adjacent saturable magnetic element. Preferably, the magnetic element is disposed between the superconductive elements and is in the form of a thin layer of saturable ferromagnetic material.

The combination of the neuristor transmission line and the learning junction provides an artificial neuron, capable of sustaining and propagating a pulse, while also having a learning ability with respect to the transmission of successive pulses. Thus, the successive pulses are effective to produce progressively increasing saturation of the magnetic material. Initially, the learning junction affords a relatively high impedance to the transmission of the pulse. With increasing saturation, the impedance is reduced. Thus, by handling a series of pulses the artificial neuron learns to transmit the pulses more efficiently.

The power dissipation of the neuristor transmission line is very low, due to the use of superconductivity. For normal electron tunneling through the barrier layer between the line conductors, the power dissipation is only about 400 microwatts per square centimeter. For tunneling by the super-conducting electrons, the power dissipation is actually zero in the resting state.

Thus, by the use of circuit printing techniques, an array can be constructed comprising a multitude of the neuristor transmission lines, with large numbers of learning junctions connected between at least some of the lines, without accumulating an excessive power dissipation. For neuristors utilizing normal electron tunneling, it is possible to achieve a packing density of approximately $10^5$ artificial neurons per cubic inch, while obviating any excessive temperature rise. When the neuristors use superconducting electron tunneling, the packing density may be considerably greater.

Further objects and advantages of the present invention will appear from the following description, taken with the accompanying drawings, in which:

FIG. 10a is a diagrammatic perspective view showing an artificial neuron comprising a neuristor transmission line with a learning junction connected between sections thereof.

FIG. 10b is a schematic representation of the artificial neuron of FIG. 10a.

As already indicated, FIGS. 1–4 illustrate a neuristor transmission line 20, capable of propagating a pulse for an indefinite distance. The neuristor transmission line 20 utilizes the phenomenon of superconductivity. Thus, the neuristor transmission line 20, as illustrated diagrammatically in FIG. 1, comprises a pair of superconductive line conductors 22 and 24, which are closely spaced and more or less elongated. To produce superconductivity, the line conductors 22 and 24 are maintained at an extremely low temperature, near absolute zero. A thin barrier layer 26 of non-superconductive or insulating material is provided between the line conductors 22 and 24. The barrier layer 26 is sufficiently thin to be penetrable by tunneling electrons. Preferably, the layer 26 is formed as an oxide on one of the line conductors 22 and 24. However, other insulating materials may be employed in the layer 26. Moreover, the barrier layer 26 may be made of conductive or semiconductive materials which do not exhibit superconductivity. Such materials include various metals, such as copper, silver, gold and nickel, for example. Copper is particularly advantageous because it is inexpensive and can easily be deposited in a thin layer through which electron tunneling will occur, by either normal or superconductive electrons.

Figure 1:
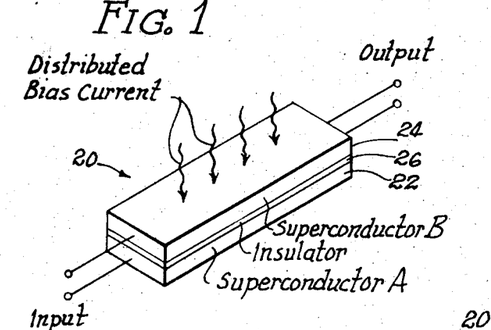
FIG. 1 is a diagrammatic perspective view showing a neuristor transmission line to be described as an illustrative embodiment of the present invention.

The line conductors 22 and 24 are preferably made of two different superconductive materials for normal electron tunneling, but may be of the same or different materials for superconducting electron tunneling. A wide variety of materials may be employed. To cite one example, the line conductor 22 may be made of tin, while the conductor 24 is made of lead. The barrier layer 26 may be made of tin oxide, grown or otherwise formed on the line conductor 22.

To produce the electron tunneling, the barrier layer 26 must be extremely thin. Thus, to produce tunneling by normal electrons the layer 26 should have a thickness of approximately 40 angstroms or less. In one embodiment, tunneling by normal electrons was produced with an oxide layer having a thickness of 30 angstroms.

To provide for tunneling by superconducting electrons, the barrier layer 26 must be thinner than in the case of tunneling by normal electrons. Thus, for example, to provide for tunneling by superconducting electrons, the thickness of the layer 26 should be approximately 20 angstroms or less. In one embodiment, such tunneling was produced with an oxide layer having a thickness in the range from 10 to 20 angstroms. These thickness figures are cited merely by way of example, because the thickness will vary in accordance with the materials employed and the manner in which the materials are prepared or deposited.

As indicated diagrammatically in FIG. 1, a distributed biasing current is produced between the line conductors 22 and 24 of the neuristor transmission line 20. The biasing current flows between the line conductors by virtue of the electron tunneling through the barrier layer 26.

It has been found that the neuristor transmission line 20 will sustain and propagate a pulse for an indefinite distance. Thus, an input pulse, applied at one end of the line 20, will be propagated along the line for an indefinite distance, without substantial attenuation, by an active process in which the pulse is continuously regenerated.

Normally, the line conductors 22 and 24 are of a substantially greater thickness than that of the barrier layer 26. The thickness of the superconductive line conductors 22 and 24 should be greater than the superconducting penetration depth. The width of the line conductors 22 and 24 is normally much greater than the thickness of the barrier layer 26. The length of the line conductors may be as great as desired.

Figure 3:
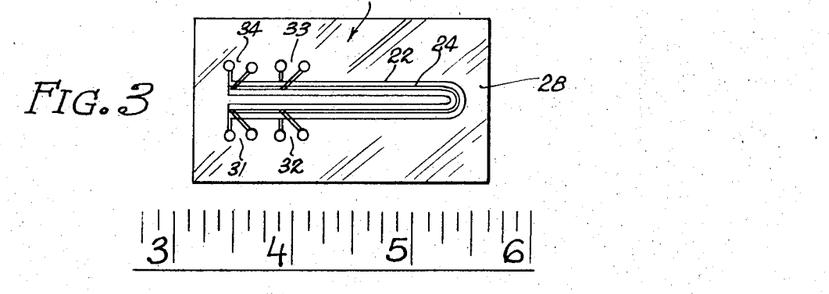
FIG. 3 is a plan view of the neuristor transmission line.
Figure 4:
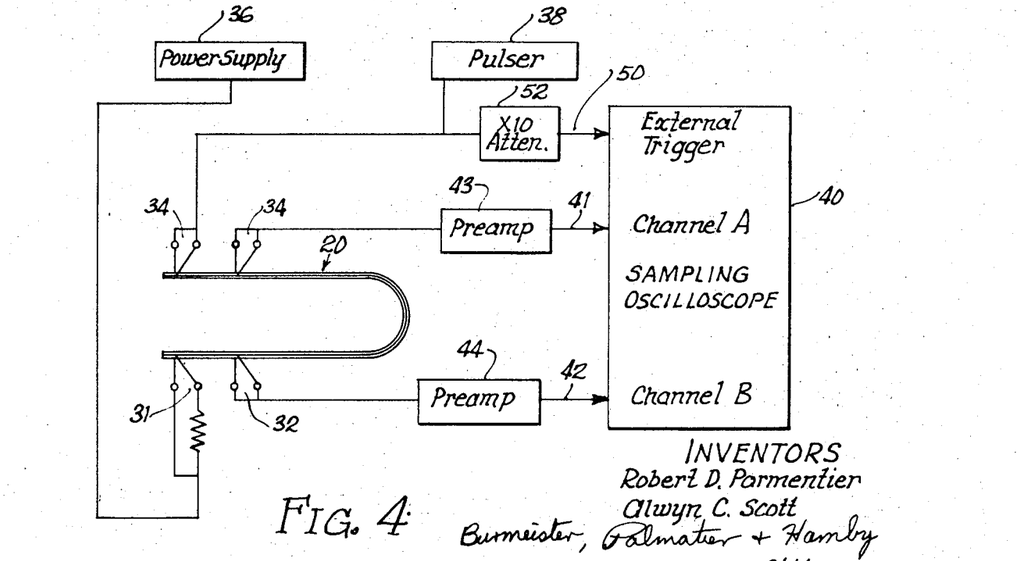
FIG. 4 is a schematic block diagram of a circuit for utilizing the neuristor transmission line to propagate pulses.

The neuristor transmission line 20, being described as an illustrative embodiment of the present invention, is shown in greater detail in FIGS. 3 and 4. It will be seen that the superconductive line conductors 22 and 24 are supported on an insulating plate 28, made of glass or any other suitable material. As shown, the line conductors 22 and 24 are U shaped, but this is merely a matter of convenience. The line conductors may be any desired shape.

In one embodiment, the line conductor 22 was deposited as a thin film of tin on the glass plate 28. The tin coating was deposited upon the plate 28 by evaporation in a high vacuum through a stencil or mask. The thickness of the conductor 22 was about 2500 angstroms, but this dimension may be varied widely. The tin film was annealed in a vacuum at room temperature for a considerable period of time, such as ten hours or more.

To produce the barrier layer 26, the tin film conductor 22 was oxidized by exposure to dried air for a considerable period of time, such as six to eight hours. The second line conductor 24 was then produced by depositing a film of lead over the oxide layer. The lead was deposited in the same manner as the tin, by evaporation in a high vacuum through a stencil. As shown, the lead film conductor 24 was narrower than the tin conductor 22.

In the illustrated embodiment of FIG. 3, four pairs of terminals, 31, 32, 33 and 34 are connected to the line conductors 22 and 24 of the neuristor transmission line 20. The terminals 31–34 may be in the form of metal dots, fused to the glass plate 28 prior to the evaporation of the tin and lead conductors 22 and 24. The metal dots may be made of indium or any other suitable material. It will be seen that the illustrated line conductors 22 and 24 are formed with portions which extend outwardly into contact with the terminals 31–34.

FIG. 4 illustrates a circuit or system for utilizing the neuristor transmission line 20. To produce the desired biasing current through the neuristor transmission line 20, a power supply 36 is connected to the terminals 31. Because the line conductors 22 and 24 are superconductive, the biasing current is distributed uniformly along the line 20. Thus, the biasing current could be supplied to the line at any desired point.

In this case, the input pulses are supplied to the line 20 through the terminals 34. Thus, a pulse generator 38 is connected to the terminals 34. The propagation of the pulses is measured at the terminals 33 and 32. In the illustrated system, the propagation of the pulses is checked by a sampling oscilloscope 40 having two input channels 41 and 42. The pulses at the terminals 33 are supplied to the first channel 41 through a preamplifier 43. Similarly, the signals at the terminals 32 are supplied to the second channel through another preamplifier 44.

Figure 2:
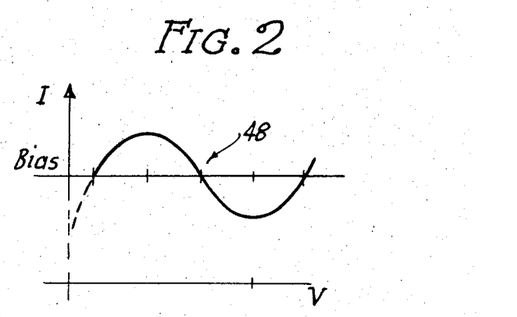
FIG. 2 is an idealized graph showing qualitatively the current-voltage characteristic of the neuristor transmission line.

FIG. 2 is a diagrammatic representation of the current-voltage characteristic of the neuristor transmission line. The voltage V and the current I are plotted along the horizontal and vertical axes, respectively. Instead of rising smoothly along its entire length, the characteristic curve has a dip or irregularity 48, representing a region of negative differential resistance, which is responsible for the active propagation of the pulses along the neuristor transmission line. The biasing current is employed to bring the operating range of the transmission line into the active region 48.

Figure 5:
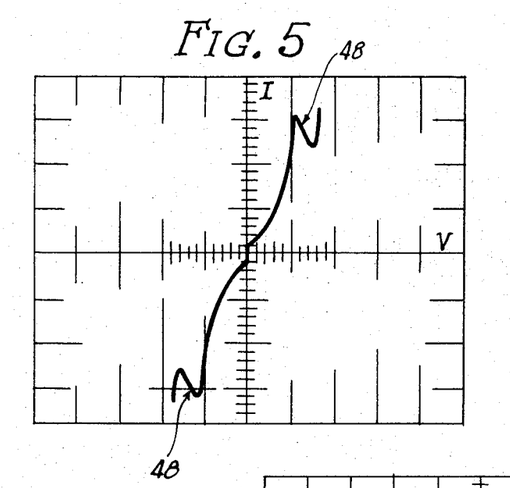
FIG. 5 is an oscillogram showing the transverse current-voltage characteristic of the neuristor transmission line.

FIG. 5 is an oscillogram showing the characteristic curve of the neuristor transmission line, as actually displayed by a curve tracing oscilloscope. The irregular or active region 48 of negative differential resistance is clearly apparent.

FIGS. 6a, 6b, 7a and 7b are oscillograms illustrating the propagation of the pulses along the neuristor transmission line in the system of FIG. 4. In each case, the upper trace represents the signal at the terminals 33, while the lower trace represents the signals at the terminals 32. The input pulses from the pulse generator 38 were substantially square in shape and had a repetition rate of approximately 500 cycles per second. The input pulses were applied to the external triggering input 50 of the oscilloscope 40 through an attenuator 52.

Figure 6A:
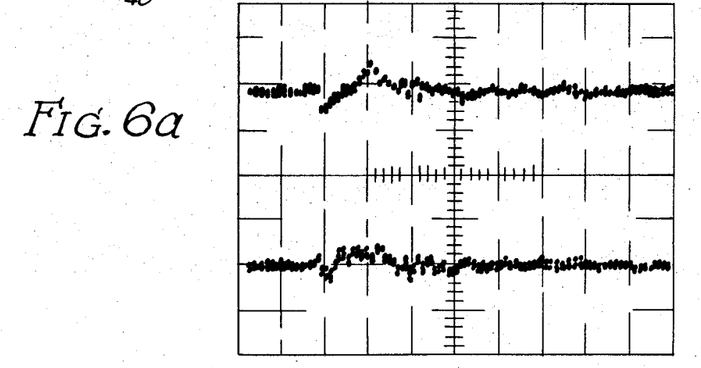
FIGS. 6a and 6b are oscillograms illustrating the pulse propagation along the neuristor transmission line for zero biasing current and operative biasing current, respectively.
Figure 6B:
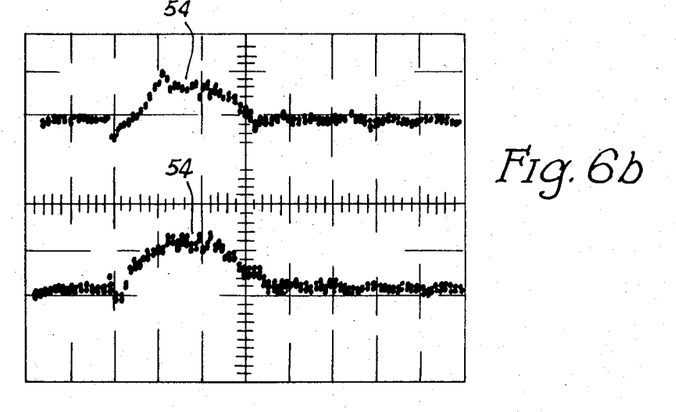

The characteristic impedance of the neuristor transmission line is extremely low, of the order of only one hundredth of an ohm. The pulse generator 38 was of a conventional type having an output impedance of about 50 ohms. Due to this severe mismatch, it was necessary to employ a pulse generator output which was much larger in amplitude than the amplitude of the pulses propagated along the neuristor transmission line. FIGS. 6a and 6b illustrate the importance of the biasing current in bringing about pulse propagation along the neuristor transmission line. FIG. 6a represents a condition of zero biasing current. It will be evident that there was virtually no pulse propagation for this condition. FIG. 6b represents a condition in which the biasing current was 240 milliamperes. In this case, both the upper and lower traces show the propagation of a neuristor pulse 54.

It was found that there was a bias threshold, below which there was no pulse propagation. This bias threshold was quite sharp. Thus, a decrease in the biasing current of only about five milliamperes was sufficient to extinguish pulse propagation.

FIGS. 6a, 6b, 7a and 7b illustrate that the neuristor pulse tends to be of a characteristic shape, regardless of the shape of the input pulses. This observation illustrates the fact that the pulse propagation is of an active or regenerative character, rather than a passive character. The characteristic shape of the pulse may be termed the dynamic steady state waveform.

Figure 7A:
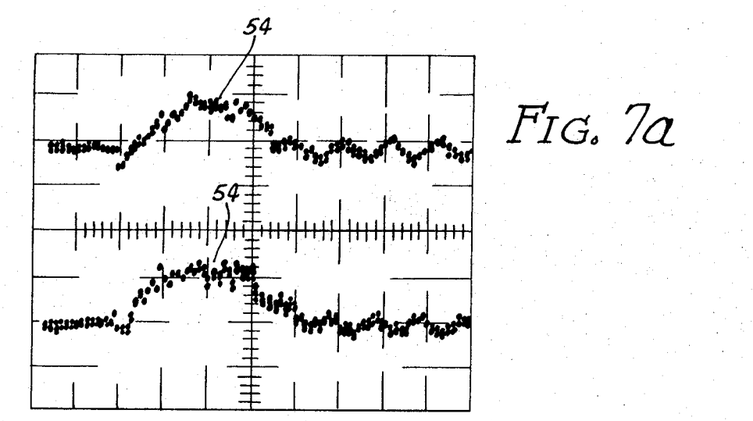
FIGS. 7a and 7b are oscillograms showing the pulse propagation along the neuristor transmission line for two different conditions of pulse input voltage and duration.
Figure 7B:
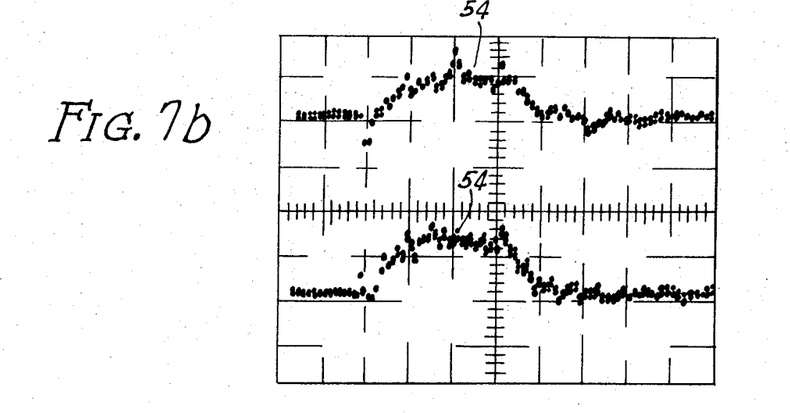

FIG. 7a represents the output pulses when the input pulses had an amplitude of 800 millivolts and a duration of 30 nanoseconds. FIG. 7b represents the output pulses for an input pulse amplitude of 1100 millivolts and a duration of 40 nanoseconds. In each case, the biasing current was 240 milliamperes. The neuristor transmission line was maintained at a temperature of about 3.3° Kelvin. The striking feature of FIGS. 7a and 7b resides in the fact that the neuristor pulses 54 are all of about the same shape and amplitude, despite the variations in the duration and amplitude of the input pulses. Thus, the shape and amplitude of the propagating pulse and largely determined by the characteristics of the neuristor transmission line, rather than being functions of the duration and amplitude of the input pulses. The observed amplitude of the propagated neuristor pulse was about ¼ of a millivolt.

A threshhold effect was also observed with respect to the amplitude of the input pulses. Thus, a minimum amplitude was necessary to produce any pulse propagation. For the system of FIG. 4, such minimum input pulse amplitude was about 350 millivolts. This threshhold was also quite sharp, occurring within a range of approximately 10 millivolts.

Figure 8:
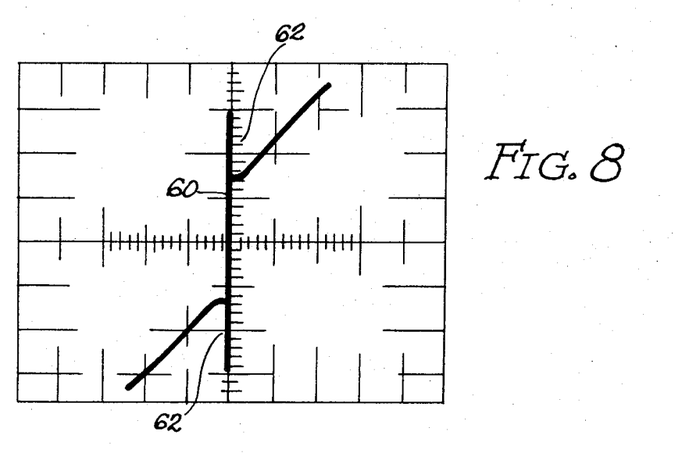
FIG. 8 is an oscillogram showing the transverse current-voltage characteristic of a modified neuristor transmission line in which the electron tunneling involves superconducting electrons.

FIG. 8 is an oscillogram showing the current-voltage characteristic curve of a neuristor transmission line utilizing electron tunneling by superconducting electrons. This characteristic curve was produced with an embodiment in which the barrier layer 26 had a thickness of only about 10 angstroms. The line conductor 22 was made of an alloy of tin and aluminum, while the other line conductor 24 was made of lead. The line conductors were produced by evaporation in a high vacuum, in the manner previously described, except that the step of annealing the tin-aluminum alloy was omitted. The barrier layer 26 was formed as an oxide on the tin-aluminum alloy but the oxidation time was greatly reduced to approximately one minute.

It will be seen from the transverse current-voltage characteristic of FIG. 8 that the curve has a portion 60 extending along the vertical axis. This portion of the curve represents the flow of current across the neuristor transmission line with zero voltage drop. Thus, this portion of the curve indicates the tunneling of superconducting electrons through the barrier layer 26. The characteristic curve has a dip or irregularity 62, representing a region of negative differential resistance.

It was that the transmission line utilizing superconducting electron tunneling was capable of propagating the input pulses, under conditions of proper biasing current adjustment. FIGS. 9a–9f show the effects of varying the biasing current. In each case, the upper trace represents the signals at the terminals 33, while the lower trace represents the signals at the terminals 32. The pulse generator output had an amplitude of about 750 millivolts with a pulse duration of 20 nanoseconds. The temperature was approximately 1.2° Kelvin. The various oscillograms represent the pulse propagation for the following biasing currents:

| FIG. | Milliamperes |
|---|---|
| 9a | 10 |
| 9b | 20 |
| 9c | 30 |
| 9d | 40 |
| 9e | 60 |
| 9f | 90 |

Figure 9A:
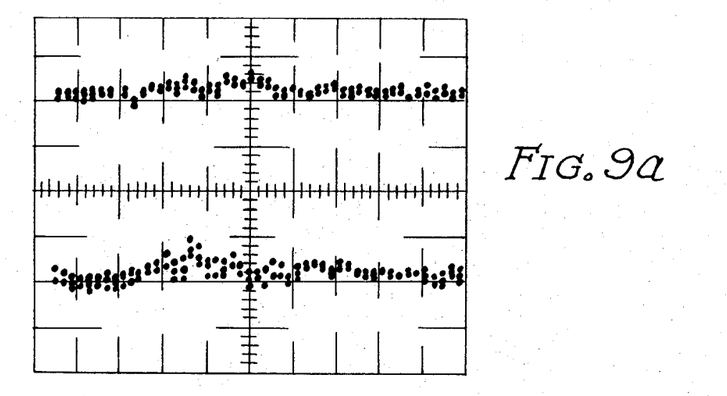
FIGS. 9a–9f are six oscillograms illustrating the pulse propagation along the modified neuristor transmission line, involving superconducting electron tunneling for progressively increasing values of bias current.
Figure 9B:
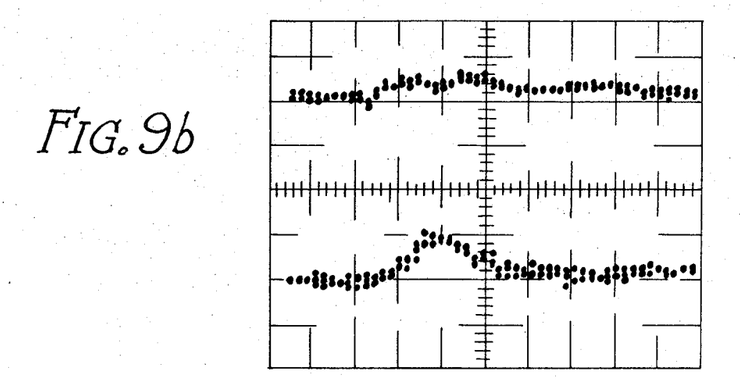
Figure 9C:
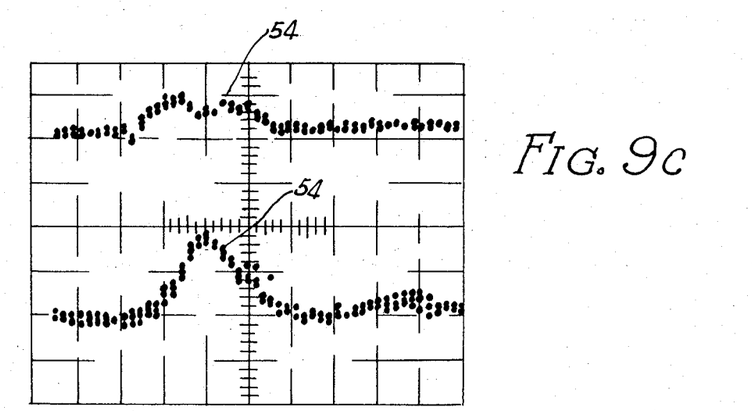
Figure 9D:
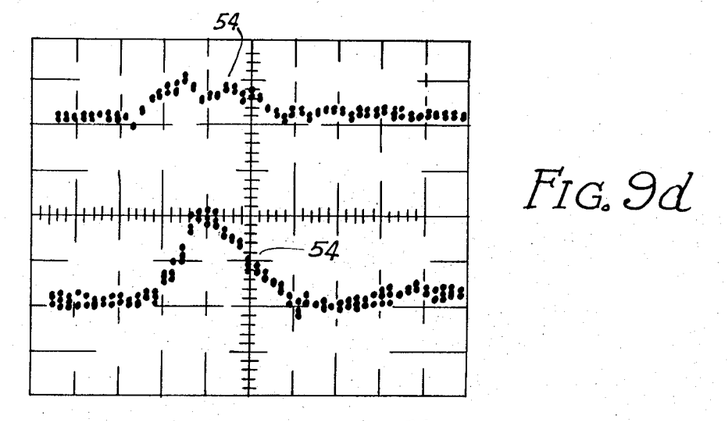
Figure 9E:
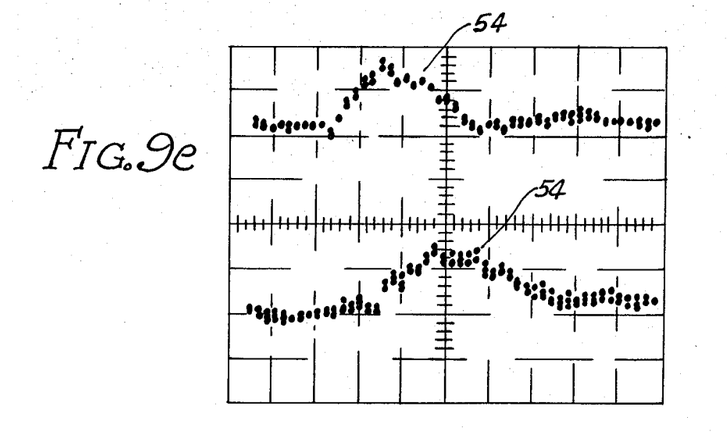
Figure 9F:
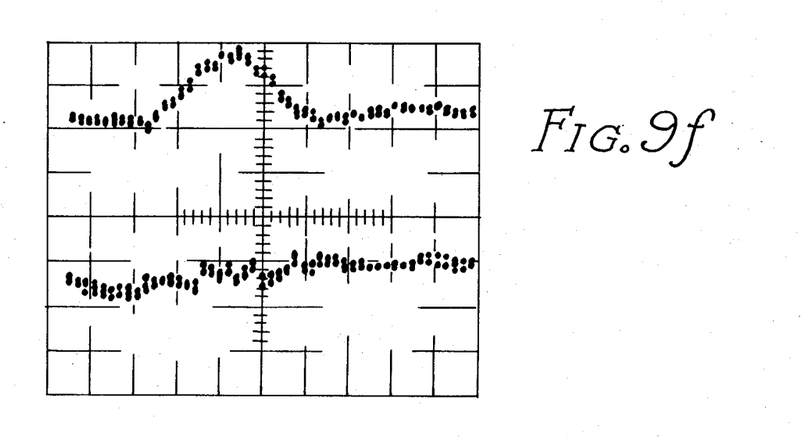

FIGS. 9c, 9d and 9e represent conditions of definite pulse propagation. For the lower and higher biasing currents, the pulses were not propagated or were propagated with noticeable attenuation. Thus the biasing current should be sufficient to bring the operating range into the region of differential negative resistance but not so great as to shift the operating range beyond such region.

The tunneling of superconducting electrons through an insulated junction was first predicted by B.D. Josephson in his paper entitled "Possible new effects in superconductive tunneling," Phys. Letters, vol. 1, pp. 251–253, July 1962. Thus such tunneling is commonly known as Josephson tunneling. The present invention provides a neuristor transmission line utilizing Josephson tunneling between the line conductors, and capable of propagating pulses for an indefinite distance without substantial attenuation.

It will be noted that the various oscillograms of FIGS. 6a, 6b, 7a, 7b and 9a–9f show a pulse delay time between the upper and lower traces, representing the time required for the neuristor pulse to be propagated between the terminals 33 and 32. From this pulse delay time, it has been found that the pulse propagation velocity is approximately $1.5 \times 10^9$ centimeters per second or about one-twentieth the velocity of light.

Figures 10A, 10B:
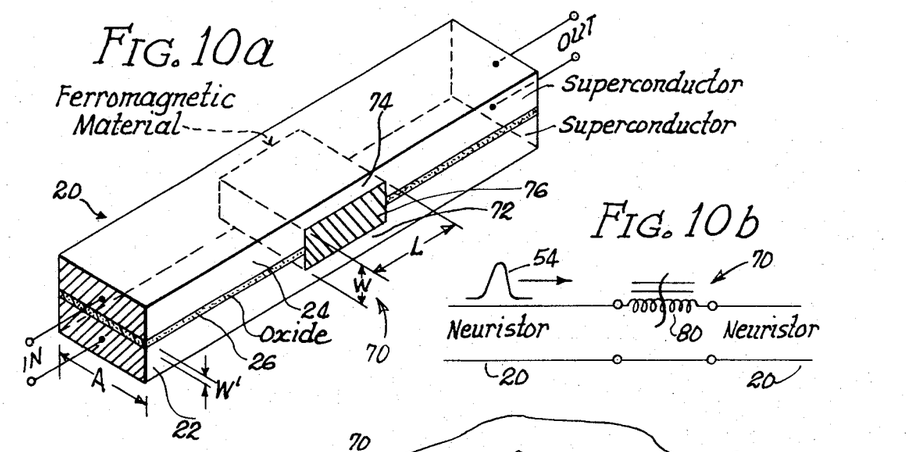

FIG. 10a illustrates a learning junction 70 which is interposed in a section of the neuristor transmission line 20. The learning junction 70 affords initial impedance to propagation of the neuristor pulse. However, arrival of successive pulses reduces this impedance so that eventually the learning junction is capable of transmitting the pulses. Thus, the learning junction initially holds back the neuristor pulses but eventually transmits them to the outgoing section of the neuristor transmission line.

The learning junction 70 comprises superconductive elements 72 and 74, together with an adjacent element 76 made of saturable ferromagnetic material. The superconductive elements 72 and 74 are connected to the superconductive line conductors 22 and 24 of the neuristor transmission line 20. Preferably, the superconductive elements 72 and 74 are formed integrally with the line conductors 22 and 24.

The saturable magnetic element 76 is preferably interposed between the superconductive elements 72 and 74. In this way, the magentic element 76 is magnetized with a high degree of efficiency by the magnetic field between the superconductive elements, due to the currents along the superconductive elements.

FIG. 10b is a diagrammatic approximation of the learning junction 70 of FIG. 10a when connected between neuristor transmission lines 20, or sections thereof. The learning junction 70 effectively provides a saturable inductor 80 connected in a series circuit between the neuristor transmission lines 20. Initially, the inductor affords sufficient impedance to attenuate the neuristor pulse, but successive pulses are effective to reduce the impedance, due to magnetic saturation, so that the neuristor pulses will eventually be transmitted.

The magnetic element 76 of the learning junction is preferably made of a saturable, highly permeable magnetic material such as Permalloy. It is preferred to form or deposit the magnetic element 76 by the use of circuit printing techniques. Of course, the superconductive elements 72 and 74 are also preferably formed or deposited by such circuit printing techniques.

The width A of the magnetic element 76 is not critical but normally corresponds to the width of the adjacent portion of the neuristor transmission line 20. The width of the superconductive elements 72 and 74 is normally the same as the width of the magnetic element 76.

The thickness W of the magnetic element 76 is normally much greater than the thickness W' of the barrier layer 26. However, the brief duration of the neuristor pulse makes it desirable to limit the thickness of the magnetic element 76. If the magnetic element 76 is made too thick, the magnetic field due to the extremely brief neuristor pulse will not be able to penetrate the magnetic element. For this reason, it is advantageous to employ a magnetic element 76 having a thickness of one micron or less, one micron being equivalent to 10,000 angstroms. A typical thickness for the magnetic element 76 is one-tenth of a micron or 1,000 angstroms.

The effective impedance of the learning junction 70 is a function of the product of the thickness W and the length L of the magnetic element 76. Inasmuch as there is a practical limit upon the thickness W, as just discussed, the length L is made great enough to provide the impedance necessary to attenuate the neuristor pulses. A typical length is about five microns, for a thickness of about one-tenth of a micron. All of these figures are given by way of examples only, and are subject to wide variations.

Figure 11:
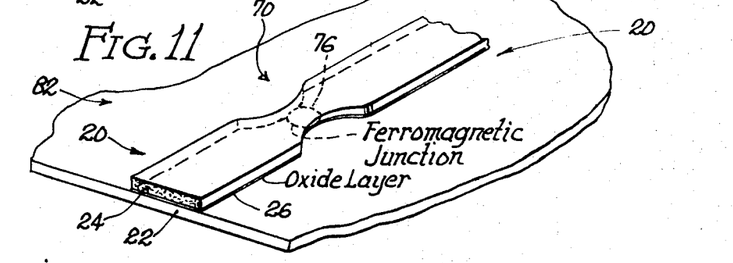
FIG. 11 is a diagrammatic perspective view showing an artificial neuron of modified construction.

FIG. 11 illustrates an artificial neuron 82, comprising the combination of a neuristor transmission line 20 and a learning junction 70. In this case, the learning junction 70 serves as an interconnection between a plurality of neuristor transmission lines 20, or sections of the same line. In FIG. 11, the magnetic element 76 of the learning junction 70 is circular in shape. The width of the learning junction 70 is somewhat less than the width of the neuristor transmission line 20. Thus, for example, the circular magnetic element 76 may have a diameter of about six microns, which is the same as the width of the learning junction 70. The width of the neuristor transmission line 20 may be about twelve microns, or approximately twice as wide. The use of a neuristor transmission line which is wider than the learning junction has the advantage of reducing the effective impedance of the neuristor transmission line, in relation to the impedance of the learning junction so that the initial attenuation of the neuristor pulse is more pronounced. This fanning out of the neuristor transmission line from the learning junction is advantageous because of the extremely brief duration of the neuristor pulse, on the order of 20 nanoseconds.

In the learning junction 70, the successive neuristor pulses, arriving at the junction along one of the neuristor transmission lines 20, drive the magnetic element 76 toward saturation. The magnetic field intensity produce by each neuristor pulse is greater than the coercive magnetic field intensity of the magnetic material, so that the pulse is able to switch or increase the magnetic field. Several neuristor pulses are required to drive the magnetic material to saturation. The required number of pulses is normally in the range of three to eight. As the magnet is saturated, the impedance of the learning junction 70 is reduced so that the neuristor pulse is propagated through the junction to the output section of the neuristor transmission line.

Figure 12:
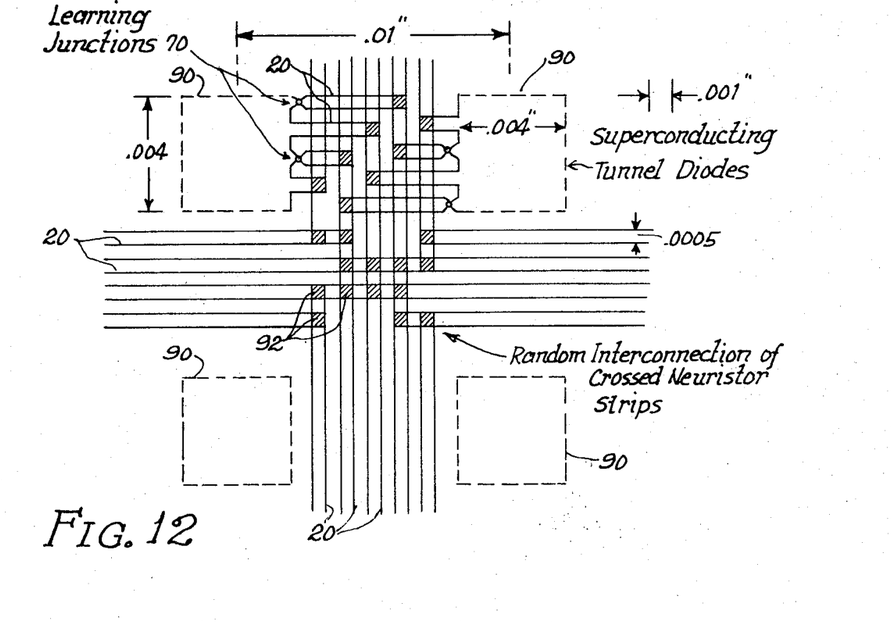
FIG. 12 is a diagrammatic plan view showing an array comprising a large number of artificial neurons, connected by learning junctions.

FIG. 12 is a diagrammatic illustration of a complex array or system comprising a large number of neuristor transmission lines 20 and learning junctions 70 combined with superconducting tunnel diodes 90. An array or system of this kind can be produced by photoresist fabrication techniques, or other circuit printing techniques. Such techniques make it possible to provide a large number of active elements in a small space. Thus, the width of the neuristor transmission lines 20 may be about five ten-thousandth of an inch. The adjacent transmission lines are spaced by a similar amount, edge to edge. The illustrated tunnel diodes 90 are square and have a width of about four-thousandths of an inch. The spacing between the adjacent tunnel diodes is one-hundredth of an inch, between centers.

A large number of the neuristor transmission lines 20 extend between the various tunnel diodes 90 in the network or array. Where the neuristor transmission lines 20 cross over one another, they may be randomly interconnected in some instances. Thus, FIG. 12 shows a plurality of such random interconnections 92, which are shaded for clarity of illustration.

A large number of the learning junctions 70 are connected between some of the neuristor transmission lines 20, or between sections thereof.

Networks of this kind have applications to computers and can form the basis for electronic brains. Applications for such networks, involving randomly interconnected elements, and having learning capabilities, have been discussed by R.L. Beurle, in several papers, including the following: "Storage and manipulation of information in random networks," First Int. Symp. on Biosimulation, Locarno, June 29–July 5, 1960. New York: Plenum Press, 1962; "Functional organization in random networks," U. of Ill. Symp. on Self-Organization, June 8–9, 1961. New York: Pergamon Press, 1962.

With a line width of one-half mil, as discussed above, the surface density of active elements in the array of FIG. 12 may be as high as 10,000 per square inch. The power dissipation of the neuristor transmission lines is only 400 microwatts per square centimeter in the case of tunneling through the barrier layer by normal electrons. With such low power dissipation, the volume density of active elements may be very high, while avoiding any objectionable rise in temperature. Because of the necessity of maintaining superconductivity, the temperature rise must be strictly limited. However, as many as 375,000 active elements per cubic inch may be provided, while limiting the rise in temperature to less than 1/10 of a °Kelvin.

A considerably greater volume density of active elements may be employed in the case of neuristor transmission lines utilizing Josephson tunneling by superconducting electrons. For such tunneling, the power dissipation of the neuristor transmission lines is zero in the resting state. Power is dissipated only when pulses are being propagated, and such power dissipation is very small. Thus for neuristor transmission lines with Josephson tunneling by superconducting electrons, the volume density of active elements may be increased by a factor of 100 or even 1000.

In summary, the present invention provides neuristor transmission lines along which neuristor pulses are actively propagated, without substantial attenuation, by continuous regeneration of the pulses. Two distinct types of transmission lines are provided as follows: (1) neuristor transmission lines utilizing tunneling by normal electrons between the superconductive line conductors; and (2) neuristor transmission lines involving electron tunneling by superconducting electrons.

The invention also provides a learning junction, adapted to be utilized as an interconnection between neuristor transmission lines. Such learning junction utilizes a saturable ferromagnetic element which initially affords substantial impedance to the passage of neuristor pulses, but is progressively saturated by the pulses so that eventually the pulses are allowed to pass to the following neuristor transmission line.

By the use of photoresist circuit printing techniques, arrays or networks may be constructed, utilizing large numbers of the neuristor transmission lines and learning junctions. Circuit printing techniques may be employed to form or deposit all of the elements, including the conductors, the barrier layers, and the magnetic elements. Because of the low power dissipation of the neuristor transmission lines, the volume density of the active elements may be on the order of one hundred thousand per cubic inch or more. Thus, it becomes within the realm of possibility to produce an electronic machine approaching $10^{10}$ active elements corresponding to the number of neurons in the cortex of the human brain.

Various other modifications, alternative constructions, and equivalents may be employed without departing from the true spirit and scope of the invention, as exemplified in the foregoing description and defined in the following claims.

We claim:

1. A neuristor transmission line capable of actively propagating an input pulse,
   comprising first and second closely spaced elongated superconductive line conductors,
   a thin barrier layer disposed between said line conductors and distributed along the length thereof,
   said layer being sufficiently thin to be penetrable by tunneling electrons,
   and means for producing a biasing current of tunneling electrons between said line conductors and through said barrier layer to produce active propagation of pulses along said line conductors.

2. A neuristor transmission line according to claim 1, in which said line conductors are made of different superconductive materials.

3. A neuristor transmission line according to claim 1, in which the temperature of said line conductors is sufficiently low to produce superconductivity in said line conductors.

4. A neuristor transmission line according to claim 1, including means for maintaining said line conductors at a sufficiently low temperature to produce superconductivity in said line conductors.

5. A neuristor transmission line according to claim 1, in which said layer is sufficiently thin to be readily penetrable by normal tunneling electrons.

6. A neuristor transmission line according to claim 1, in which one of said line conductors is made of superconductive tin and the other of lead.

7. A neuristor transmission line according to claim 1, in which one of said line conductors is made of superconductive tin and the other of lead,
   said layer comprising tin oxide formed on said tin line conductor.

8. A neuristor transmission line according to claim 1, in which said layer is sufficiently thin to be readily penetrable by superconducting electrons.

9. A neuristor transmission line according to claim 1, in which said layer is of a thickness of approximately 20 angstroms or less.

10. A neuristor transmission line according to claim 1, in which one of said line conductors is made of a superconductive tin-aluminum alloy and the other of lead.

11. A neuristor transmission line according to claim 10, in which said layer comprises an oxide formed on said alloy.

12. A neuristor transmission line according to claim 1, in which said barrier layer is made of insulting material.

13. A neuristor transmission line according to claim 1, in which said barrier layer is made of a material which is conductive but not superconductive.

14. A neuristor transmission line according to claim 1, in which said barrier layer is made of metal.

15. A neuristor transmission line according to claim 1, in which said barrier layer is made of copper.

16. A neuristor transmission line capable of actively propagating an input pulse,
    comprising first and second closely spaced elongated superconductive line conductors,
    a thin barrier layer disposed between said line conductors and distributed along the length thereof,
    said layer being sufficiently thin to be penetrable by tunneling electrons,
    and means for producing a unidirectional biasing current of tunneling electrons between said line conductors and through said barrier layer and of a magnitude to provide an operating characteristic affording a negative differential resistance to produce active propagation of pulses along said line conductors.

17. A neuristor transmission line according to claim 16, in which said line conductors are made of different superconductive materials.

18. A neuristor transmission line according to claim 16, in which said layer is sufficiently thin to be readily penetrable by normal tunneling electrons.

19. A neuristor transmission line according to claim 16, in which said barrier layer is sufficiently thin to be readily penetrable by superconducting electrons.

20. A neuristor transmission line according to claim 16, in which said barrier layer comprises an oxide formed on one of said line conductors.

21. A neuristor transmission line according to claim 16, in which said barrier layer is made of insulating material.

22. A neuristor transmission line according to claim 16, in which said barrier layer is made of a material which is conductive but not superconductive.

23. A neuristor transmission line according to claim 16, in which said barrier layer is made of metal.

24. A neuristor transmission line according to claim 16, in which said barrier layer is made of copper.

* * * * *